United States Patent
Liu et al.

(10) Patent No.: US 8,665,980 B2
(45) Date of Patent: Mar. 4, 2014

(54) ANTENNA DIVERSITY APPARATUS AND ANTENNA DIVERSITY METHOD

(75) Inventors: Der-Zheng Liu, Hsinchu County (TW); Yung-Ting Chen, Hsinchu County (TW); Kuang-Yu Yen, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 108 days.

(21) Appl. No.: 13/251,282

(22) Filed: Oct. 2, 2011

(65) Prior Publication Data

US 2012/0087431 A1    Apr. 12, 2012

(30) Foreign Application Priority Data

Oct. 8, 2010 (TW) ............................... 99134447 A

(51) Int. Cl.
*H04L 1/02* (2006.01)
(52) U.S. Cl.
USPC .......................................... 375/267; 375/260
(58) Field of Classification Search
USPC ........................................................ 375/267
See application file for complete search history.

(56) References Cited

U.S. PATENT DOCUMENTS

| | | | | |
|---|---|---|---|---|
| 5,818,543 | A * | 10/1998 | Lee ................ | 348/725 |
| 6,021,166 | A * | 2/2000 | Suzuki ........... | 375/347 |
| 6,275,181 | B1 * | 8/2001 | Kitayoshi ....... | 342/74 |
| 6,907,094 | B2 * | 6/2005 | Matsui et al. ... | 375/347 |
| 7,454,234 | B2 | 11/2008 | Doi et al. | |
| 7,535,971 | B2 * | 5/2009 | Yen et al. ....... | 375/267 |
| 8,200,302 | B2 * | 6/2012 | Yamamoto et al. .... | 455/575.7 |
| 2004/0042428 | A1 * | 3/2004 | Hamalainen et al. ... | 370/335 |
| 2005/0130098 | A1 * | 6/2005 | Warner ........... | 433/77 |
| 2006/0154618 | A1 * | 7/2006 | Doi et al. ....... | 455/78 |
| 2006/0160489 | A1 * | 7/2006 | Hardacker ...... | 455/66.1 |
| 2006/0194542 | A1 * | 8/2006 | Doi et al. ....... | 455/63.4 |
| 2006/0203945 | A1 * | 9/2006 | Yen et al. ....... | 375/347 |
| 2006/0293015 | A1 * | 12/2006 | Mori et al. ..... | 455/276.1 |

(Continued)

FOREIGN PATENT DOCUMENTS

CN            101527589 A        9/2009

OTHER PUBLICATIONS

English Abstract translation of CN101527589 (Published Sep. 9, 2009).
Machine Translation of CN101527589 (Published Sep. 9, 2009).

*Primary Examiner* — Chieh M Fan
*Assistant Examiner* — Santiago Garcia
(74) *Attorney, Agent, or Firm* — McClure, Qualey & Rodack, LLP

(57) ABSTRACT

The present invention provides an antenna diversity apparatus and an antenna diversity method. The antenna diversity apparatus comprises: a plurality groups of antennas, a switching unit, a demodulating unit, an antenna switch selecting unit, and a control unit, wherein each group of the plurality groups of antennas comprises at least an antenna, and the control unit can comprises: a receiving signal quality detecting unit, a packet detecting unit, and an antenna decision unit. The antenna decision unit can be realized by hardware, firmware, or software, and the antenna switch selecting unit can be realized by hardware. The antenna diversity apparatus and the antenna diversity method provided by the present invention can switch antennas fast to avoid the defect of occurring burst error to reduce transmitting data rate, and switch to proper antennas fast when variation of the data transmission channels occurs.

20 Claims, 12 Drawing Sheets

(56) References Cited

U.S. PATENT DOCUMENTS

| | | | |
|---|---|---|---|
| 2007/0224947 A1* | 9/2007 | Campbell et al. | 455/101 |
| 2008/0043872 A1* | 2/2008 | Hansen | 375/264 |
| 2008/0240276 A1* | 10/2008 | Song et al. | 375/262 |
| 2009/0027260 A1* | 1/2009 | Runyon et al. | 342/352 |
| 2009/0028225 A1* | 1/2009 | Runyon et al. | 375/219 |
| 2009/0196371 A1* | 8/2009 | Yamamoto et al. | 375/267 |
| 2009/0213955 A1* | 8/2009 | Higuchi et al. | 375/267 |
| 2009/0279630 A1* | 11/2009 | Ma et al. | 375/267 |
| 2010/0195754 A1* | 8/2010 | Li et al. | 375/267 |
| 2010/0260284 A1* | 10/2010 | Yoshii et al. | 375/295 |
| 2012/0106665 A1* | 5/2012 | Nakao | 375/260 |

* cited by examiner

ANTENNA DIVERSITY APPARATUS AND ANTENNA DIVERSITY METHOD

BACKGROUND OF THE INVENTION

1. Field of the Invention

The present invention relates to an antenna diversity apparatus and an antenna diversity method, and more particularly, to an antenna diversity apparatus and an antenna diversity method capable of switching antennas fast.

2. Description of the Prior Art

In order to determine which antenna has a better signal quality, the conventional method (such as Taiwan Patent No. 256,205) using a certain antenna to receive packet information (such as receiving signal strength and receiving signal quality, etc. . . . ) for a specific time period, and then determine whether to switch antenna according to the statistic result. Since the conventional method constantly uses the certain antenna to receive packets, if the conventional method selects an antenna having worse receiving signal quality, then there will be burst error during the specific time period, and result in lower packet transmitting data rate for the transmitting terminal at the opposite side.

Please refer to FIG. 1 and FIG. 2. FIG. 1 shows a simplified block diagram of an antenna diversity apparatus 100 of Taiwan Patent No. 256,205. FIG. 2 is a flowchart showing an antenna diversity method of Taiwan Patent No. 256,205. The antenna diversity method uses an initial antenna to receive transmitted signals for a specific time period, and record a statistic result of the receiving signal quality of the initial antenna. Next, the antenna diversity method switch to another antenna from the initial antenna, and record another statistic result of the another antenna. Afterwards, the antenna diversity method compares the statistic results of these two antennas, so as to decide which antenna has a better receiving signal quality, and then the antenna diversity method controls the switching unit 130 to switch to the antenna having the better receiving signal quality. As to this antenna diversity method, since there are a plurality of packets during the specific time period of switching antennas, when the antenna diversity method controls the switching unit 130 to switch to the antenna having the worse receiving signal quality, there will be burst error to reduce transmitting data rate. In addition, when variation of the data transmission channels occurs, it will take a longer time to re-find an antenna and switch to the optimal antenna.

SUMMARY OF THE INVENTION

It is therefore one of the objectives of the present invention to provide an antenna diversity apparatus and an antenna diversity method capable of switching antennas fast, so as to solve the above problem.

In accordance with an embodiment of the present invention, an antenna diversity apparatus is disclosed. The antenna diversity apparatus comprises: a plurality groups of antennas, a switching unit, a demodulating unit, and an antenna switch selecting unit. Each group of antenna comprises at least an antenna. The switching unit is coupled to the plurality groups of antennas, and utilized for making a selection of a group of receiving antenna from the plurality groups of antennas to receive a transmission signal. The demodulating unit is coupled to the switching unit, and the demodulating unit comprises a packet detector which is utilized for detecting the transmission signal to generate a packet detecting signal. The antenna switch selecting unit is coupled to the switching unit and the packet detector of the demodulating unit, and utilized for receiving the packet detecting signal from the packet detector, and generating an antenna switch control signal according to the packet detecting signal to control the switching unit to switch among the plurality groups of antennas, so as to change the selection of the group of receiving antenna.

In accordance with an embodiment of the present invention, an antenna diversity method is disclosed. The antenna diversity method comprises: providing an antenna setting signal; making a selection of a group of receiving antenna from a plurality groups of antennas to receive a transmission signal, wherein each group of antenna comprises at least an antenna; detecting the transmission signal to generate a packet detecting signal; and generating an antenna switch control signal according to the packet detecting signal to switch among the plurality groups of antennas so as to change the selection of the group of receiving antenna.

Briefly summarized, the antenna diversity apparatus and the antenna diversity method provided by the present invention can switch antennas fast to avoid the defect of occurring burst error to reduce transmitting data rate, and switch to proper antennas fast when variation of the data transmission channels occurs.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
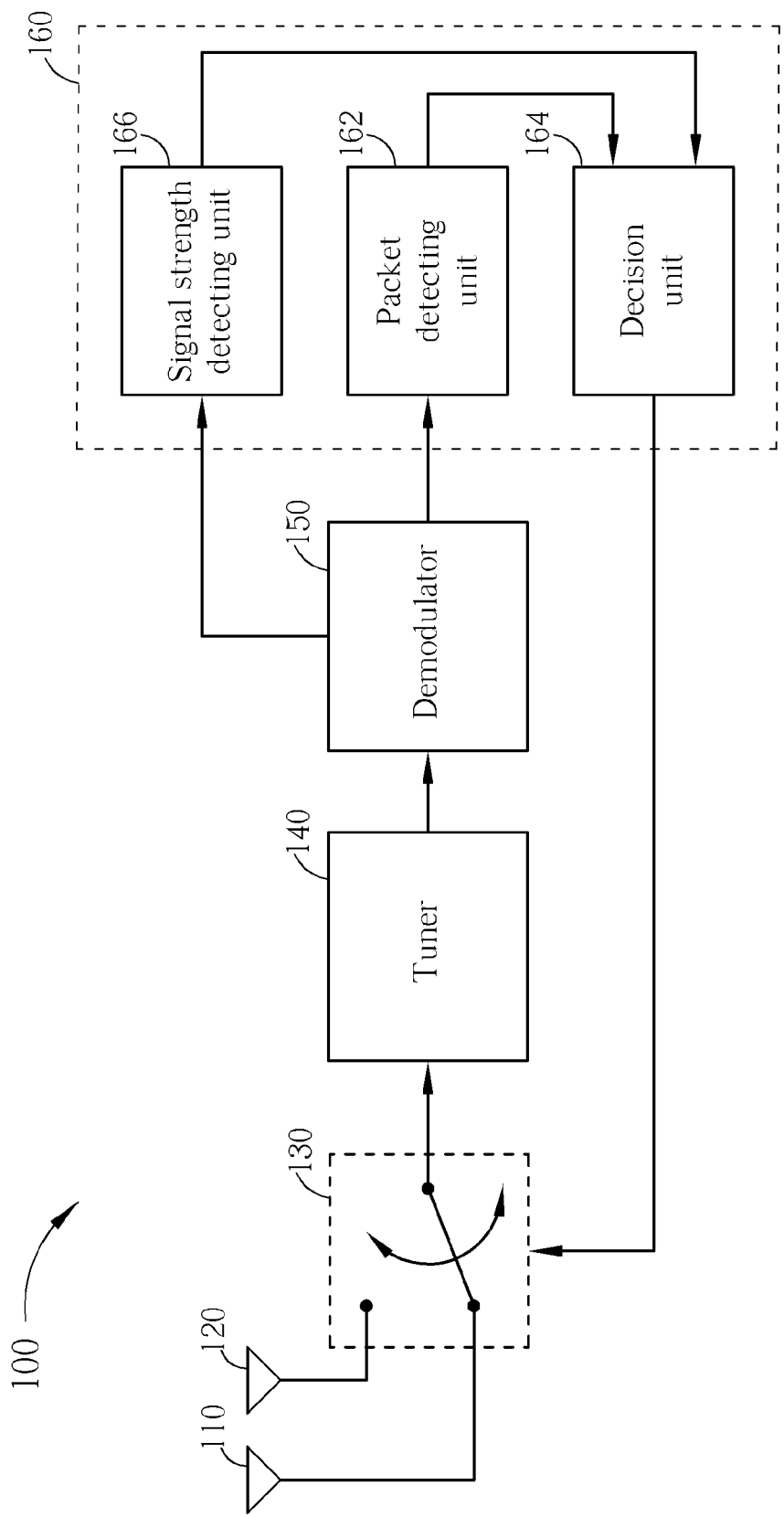
FIG. 1 shows a simplified block diagram of an antenna diversity apparatus of Taiwan Patent No. 256,205.
Figure 2:
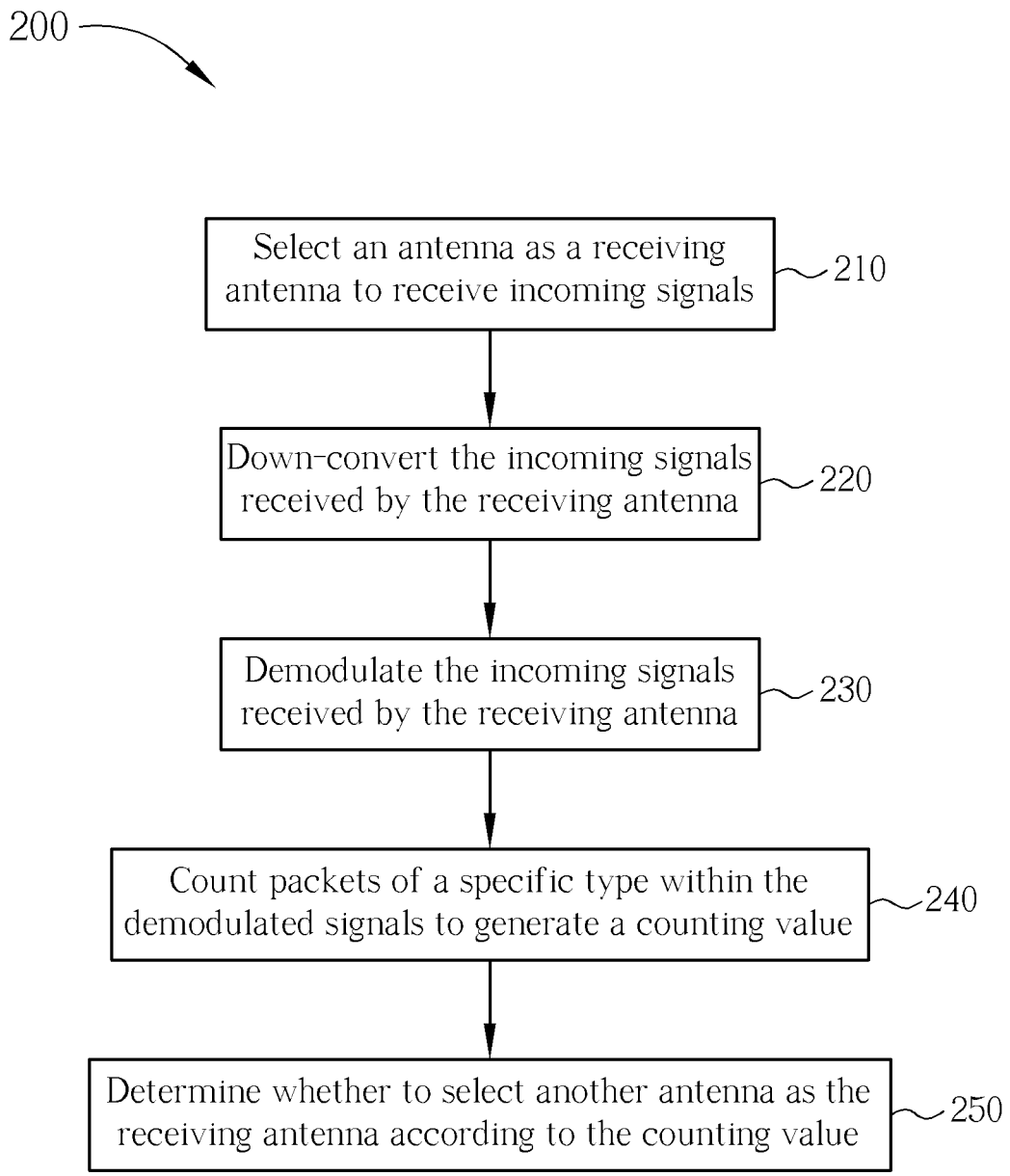
FIG. 2 is a flowchart showing an antenna diversity method of Taiwan Patent No. 256,205.
Figure 3:
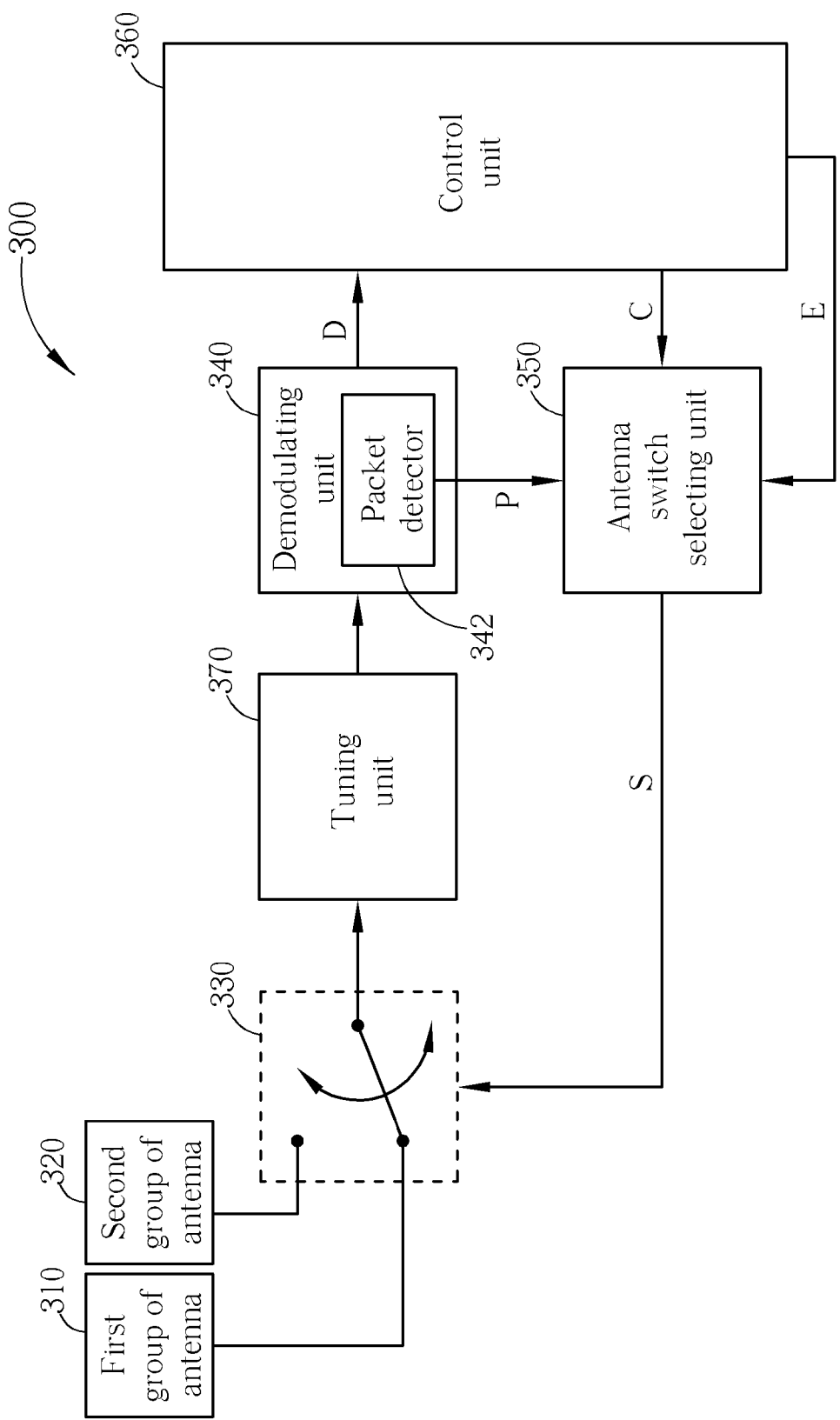
FIG. 3 shows a simplified block diagram of an antenna diversity apparatus in accordance with a first embodiment of the present invention.

Please refer to FIG. 3. FIG. 3 shows a simplified block diagram of an antenna diversity apparatus 300 in accordance with a first embodiment of the present invention. As shown in FIG. 3, the antenna diversity apparatus 300 comprises: a first group of antenna 310, a second group of antenna 320, a switching unit 330, a demodulating unit 340, an antenna switch selecting unit 350, a control unit 360, and a tuning unit 370, wherein the first group of antenna 310 and the second group of antenna 320 can comprise at least an antenna, respectively. The switching unit 330 is coupled to the first group of antenna 310 and the second group of antenna 320, and utilized for making a selection of a group of receiving antenna from the first group of antenna 310 and the second group of antenna 320 to receive a transmission signal. The demodulating unit 340 is coupled to the switching unit 330, and utilized for demodulating the transmission signal to generate a demodulation signal D, wherein the demodulating unit 340 further comprises a packet detector 342 which is utilized for detecting the transmission signal to generate a packet detecting signal P (such as a clear channel assessment (CCA)). The antenna switch selecting unit 350 is coupled to the switching unit 330 and the packet detector 342 of the demodulating unit 340, and utilized for receiving the packet detecting signal P from the packet detector 342, and generating an antenna switch control signal S according to the packet detecting signal P to control the switching unit 330 to switch among the first group of antenna 310 and the second group of antenna 320, so as to change the selection of the group of receiving antenna. The antenna switch selecting unit 350 can generate the antenna switch control signal S according to any packet starting time point or any packet ending time point provided by the packet detecting signal P to control the switching unit 330 to switch among the first group of antenna 310 and the second group of antenna 320, so as to change the selection of the group of receiving antenna. Or, the antenna switch selecting unit 350 also can generate the antenna switch control signal S according to each packet starting time point or each packet ending time point provided by the packet detecting signal P to control the switching unit 330 to switch among the first group of antenna 310 and the second group of antenna 320, so as to change the selection of the group of receiving antenna. Herein, please note that the antenna switch selecting unit 350 can be realized by a digital logic circuit, since using the hardware can switch antennas fast.

The control unit 360 is coupled to the demodulating unit 340 and the antenna switch selecting unit 350, and utilized for receiving the demodulation signal D from the demodulating unit 340 and providing an antenna setting signal C to control the selection of the group of receiving antenna, and generate a control signal E to decide the antenna switch selecting unit 350 whether to enter or leave an antenna training mode, wherein the control unit 360 can decide whether to control the antenna switch selecting unit 350 to enter the antenna training mode according to the receiving signal quality of the group of receiving antenna. Or, the control unit 360 also can decide whether to control the antenna switch selecting unit 350 to enter the antenna training mode according to a specific time period. After the control unit 360 controls the antenna switch selecting unit 350 to enter the antenna training mode, the antenna switch control signal S generated by the antenna switch selecting unit 350 will control the switching unit 330 to switch from one group of the first group of antenna 310 and the second group of antenna 320 to another group of the first group of antenna 310 and the second group of antenna 320 at any packet ending time point of the packet detecting signal P; or, the antenna switch control signal S generated by the antenna switch selecting unit 350 will control the switching unit 330 to switch from one group of the first group of antenna 310 and the second group of antenna 320 to another group of the first group of antenna 310 and the second group of antenna 320 at each packet ending time point of the packet detecting signal P. The control unit 360 can check and record an antenna training mode signal quality corresponding to the group of receiving antenna selected by the switching unit 330 according to the demodulation signal D, so as to obtain a plurality of antenna training mode signal qualities respectively corresponding to the first group of antenna 310 and the second group of antenna 320. In other words, when the antenna diversity apparatus 300 comprises a plurality groups of antennas, the control unit 360 can check and record an antenna training mode signal quality corresponding to the group of receiving antenna selected by the switching unit 330 according to the demodulation signal D, so as to obtain a plurality of antenna training mode signal qualities respectively corresponding to the plurality groups of antennas. In addition, the control unit 360 also can decide whether to control the antenna switch selecting unit 350 to leave the antenna training mode according to another specific time period. After the control unit 360 controls the antenna switch selecting unit 350 to leave the antenna training mode, the control unit 360 will compare two antenna training mode signal qualities respectively corresponding to the first group of antenna 310 and the second group of antenna 320 to generate a comparison result, and updates the antenna setting signal C according to the comparison result to control the selection of the group of receiving antenna via the antenna switch selecting unit 350 and the switching unit 330. Each antenna training mode signal quality comprises a receiving signal quality and a packet detecting result. The receiving signal quality can comprise information such as receiving signal strength information (RSSI), signal noise ratio (SNR), an channel status information (CSI), etc. . . . , and the packet detecting result can comprise information such as bit error rate and packet error rate, etc. . . . The tuning unit 370 is coupled between the switching unit 330 and the demodulating unit 340, and utilized for performing a down converting process for the transmission signal.

Figure 4:
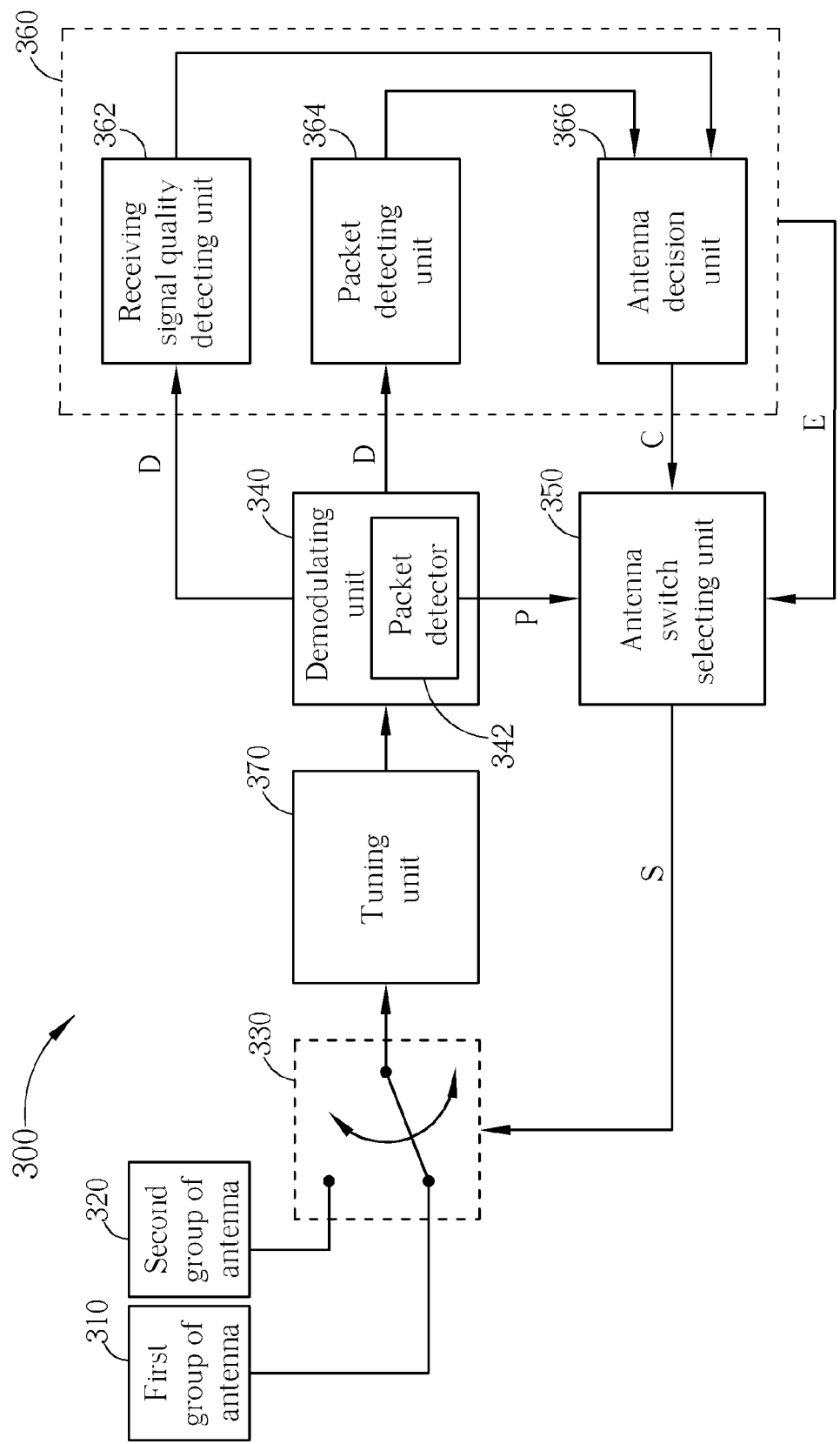
FIG. 4 shows a simplified block diagram of an antenna diversity apparatus in accordance with another embodiment of the present invention.

Please note that the above embodiment is only for an illustrative purpose and is not meant to be a limitation of the present invention. For example, please refer to FIG. 4. FIG. 4 shows a simplified block diagram of an antenna diversity apparatus 300 in accordance with another embodiment of the present invention. As shown in FIG. 4, the control unit 360 of the antenna diversity apparatus 300 in FIG. 3 can further comprise: a receiving signal quality detecting unit 362, a packet detecting unit 364, and an antenna decision unit 366, wherein the antenna decision unit 366 can be realized by a hardware, a firmware, or a software, and the antenna switch selecting unit 350 can be realized by a hardware. The receiving signal quality detecting unit 362 is coupled to the demodulating unit 340, and utilized for detecting a plurality of receiving signal qualities of the first group of antenna 310 and the second group of antenna 320. The packet detecting unit 364 is coupled to the demodulating unit 340, and utilized for generating a plurality of packet detecting results of the first group of antenna 310 and the second group of antenna 320. The antenna decision unit 366 is coupled to the receiving signal quality detecting unit 362, the packet detecting unit 364, and the antenna switch selecting unit 350, and the antenna decision unit 366 is utilized for providing the antenna setting signal C to control the selection of the group of receiving antenna, and generate the control signal E to decide the antenna switch selecting unit 350 whether to enter or leave the antenna training mode, wherein after the antenna decision unit 366 controls the antenna switch selecting unit 350 to enter the antenna training mode, the antenna decision unit 366 records the antenna training mode signal quality corresponding to the group of receiving antenna selected by the switching unit 330, and the antenna decision unit 366 compares the receiving signal qualities and the packet detecting results respectively corresponding to the first group of antenna 310 and the second group of antenna 320 to generate a comparison result, and updates the antenna setting signal C according to the comparison result to control the selection of the group of receiving antenna via the antenna switch selecting unit 350 and the switching unit 330. The antenna decision unit 366 can decide whether to control the antenna switch selecting unit 350 to enter the antenna training mode according to the receiving signal quality of the group of receiving antenna. Or, the antenna decision unit 366 can decide whether to control the antenna switch selecting unit 350 to enter the antenna training mode according to a specific time period.

After the antenna decision unit 366 controls the antenna switch selecting unit 350 to enter the antenna training mode, the antenna switch control signal S generated by the antenna switch selecting unit 350 will control the switching unit 330 to switch from one group of the first group of antenna 310 and the second group of antenna 320 to another group of the first group of antenna 310 and the second group of antenna 320 at any packet ending time point of the packet detecting signal P; or, the antenna switch control signal S generated by the antenna switch selecting unit 350 will control the switching unit 330 to switch from one group of the first group of antenna 310 and the second group of antenna 320 to another group of the first group of antenna 310 and the second group of antenna 320 at each packet ending time point of the packet detecting signal P. In addition, the antenna decision unit 366 also can decide whether to control the antenna switch selecting unit 350 to leave the antenna training mode according to another specific time period. After or before the antenna decision unit 366 controls the antenna switch selecting unit 350 to leave the antenna training mode, the antenna decision unit 366 will compare the receiving signal qualities and the packet detecting results respectively corresponding to the first group of antenna 310 and the second group of antenna 320 to generate a comparison result, and updates the antenna setting signal C according to the comparison result to control the selection of the group of receiving antenna via the antenna switch selecting unit 350 and the switching unit 330. The receiving signal quality can comprise information such as receiving signal strength information (RSSI), signal noise ratio (SNR), an channel status information (CSI), etc. . . . , and the packet detecting result can comprise information such as bit error rate and packet error rate, etc. . . .

Figure 5:
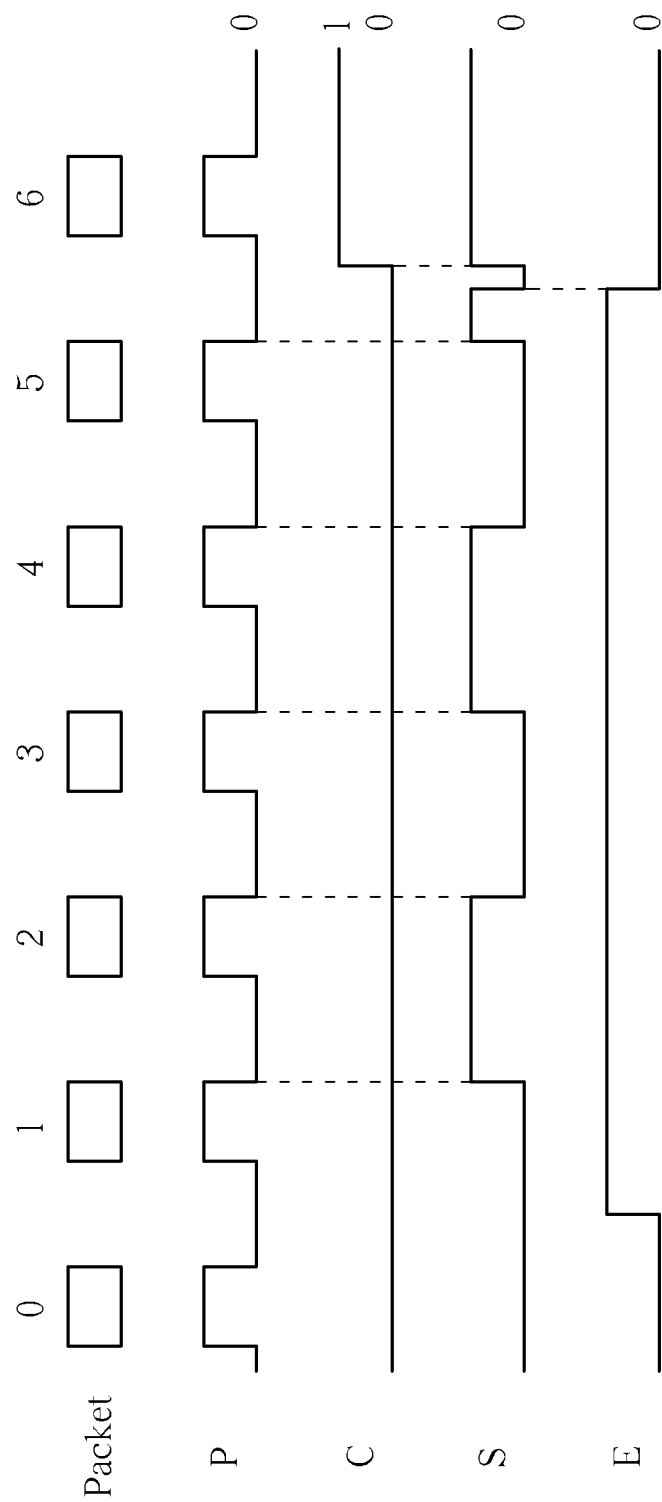
FIG. 5 shows a simplified timing diagram of a plurality of packets 0-6, the packet detecting signal P, the antenna switch control signal S, the control signal E, and the antenna setting signal C of the antenna diversity apparatus.

Please refer to FIG. 5 for further illustration about the operation of the antenna diversity apparatus 300 in the above embodiments of the present invention. FIG. 5 shows a simplified timing diagram of a plurality of packets 0-6, the packet detecting signal P, the antenna switch control signal S, the control signal E, and the antenna setting signal C of the antenna diversity apparatus 300. As shown in FIG. 5, for example, an initial signal value of the antenna setting signal C provided by the antenna decision unit 366 is 0, that is, the first group of antenna 310 is selected as the group of receiving antenna in the beginning. An initial signal value of the control signal E generated by the antenna decision unit 366 is 0, that is, the antenna switch selecting unit 350 has not entered the antenna training mode yet in the beginning. When receiving no packet, the signal value of the packet detecting signal P is 0, and the signal value of the packet detecting signal P is 1 during receiving any packet. Next, when the signal value of the control signal E generated by the antenna decision unit 366 converts from 0 to 1, this means that the antenna switch selecting unit 350 starts to enter the antenna training mode, and after the antenna switch selecting unit 350 has entered the antenna training mode, the packet 1 will be received by the first group of antenna 310. Next, at the packet ending time point of the packet 1, the signal value of the antenna switch control signal S generated by the antenna switch selecting unit 350 will convert from 0 to 1, that is, the antenna switch control signal S generated by the antenna switch selecting unit 350 will control the switching unit 330 to switch from the first group of antenna 310 to the second group of antenna 320, and thus the packet 2 is received by the second group of antenna 320. Next, at the packet ending time point of the packet 2, the signal value of the antenna switch control signal S generated by the antenna switch selecting unit 350 will convert from 1 to 0, that is, the antenna switch control signal S generated by the antenna switch selecting unit 350 will control the switching unit 330 to switch from the second group of antenna 320 to the first group of antenna 310, and thus the packet 3 is received by the first group of antenna 310. Next, at the packet ending time point of the packet 3, the signal value of the antenna switch control signal S generated by the antenna switch selecting unit 350 will convert from 0 to 1, that is, the antenna switch control signal S generated by the antenna switch selecting unit 350 will control the switching unit 330 to switch from the first group of antenna 310 to the second group of antenna 320, and thus the packet 4 is received by the second group of antenna 320. Next, at the packet ending time point of the packet 4, the signal value of the antenna switch control signal S generated by the antenna switch selecting unit 350 will convert from 1 to 0, that is, the antenna switch control signal S generated by the antenna switch selecting unit 350 will control the switching unit 330 to switch from the second group of antenna 320 to the first group of antenna 310, and thus the packet 5 is received by the first group of antenna 310. Next, at the packet ending time point of the packet 5, the signal value of the antenna switch control signal S generated by the antenna switch selecting unit 350 will convert from 0 to 1, that is, the antenna switch control signal S generated by the antenna switch selecting unit 350 will control the switching unit 330 to switch from the first group of antenna 310 to the second group of antenna 320. During this process, the control unit 360 can check and record the antenna training mode signal qualities corresponding to the first group of antenna 310 and the second group of antenna 320 selected by the switching unit 330 according to the demodulation signal D mentioned above. Next, when the signal value of the control signal E generated by the antenna decision unit 366 converts from 1 to 0, this means that the antenna switch selecting unit 350 starts to leave the antenna training mode, and when the antenna switch selecting unit 350 leaves the antenna training mode, the signal value of the antenna switch control signal S will convert from 1 to 0 at the same time, that is, the antenna switch control signal S generated by the antenna switch selecting unit 350 will control the switching unit 330 to switch from the second group of antenna 320 to the first group of antenna 310. In other words, the antenna switch selecting unit 350 will control the switching unit 330 to switch back to the initially selected group of receiving antenna. After the antenna switch selecting unit 350 leaves the antenna training mode, the control unit 360 will compare two antenna training mode signal qualities respectively corresponding to the first group of antenna 310 and the second group of antenna 320 to generate a comparison result, and updates the antenna setting signal C according to the comparison result. If the antenna training mode signal quality of the first group of antenna 310 is better than the antenna training mode signal quality of the second group of antenna 320, the signal value of the antenna setting signal C will be updated to be 1, and thus the packet 6 is received by the second group of antenna 320.

Figure 6:
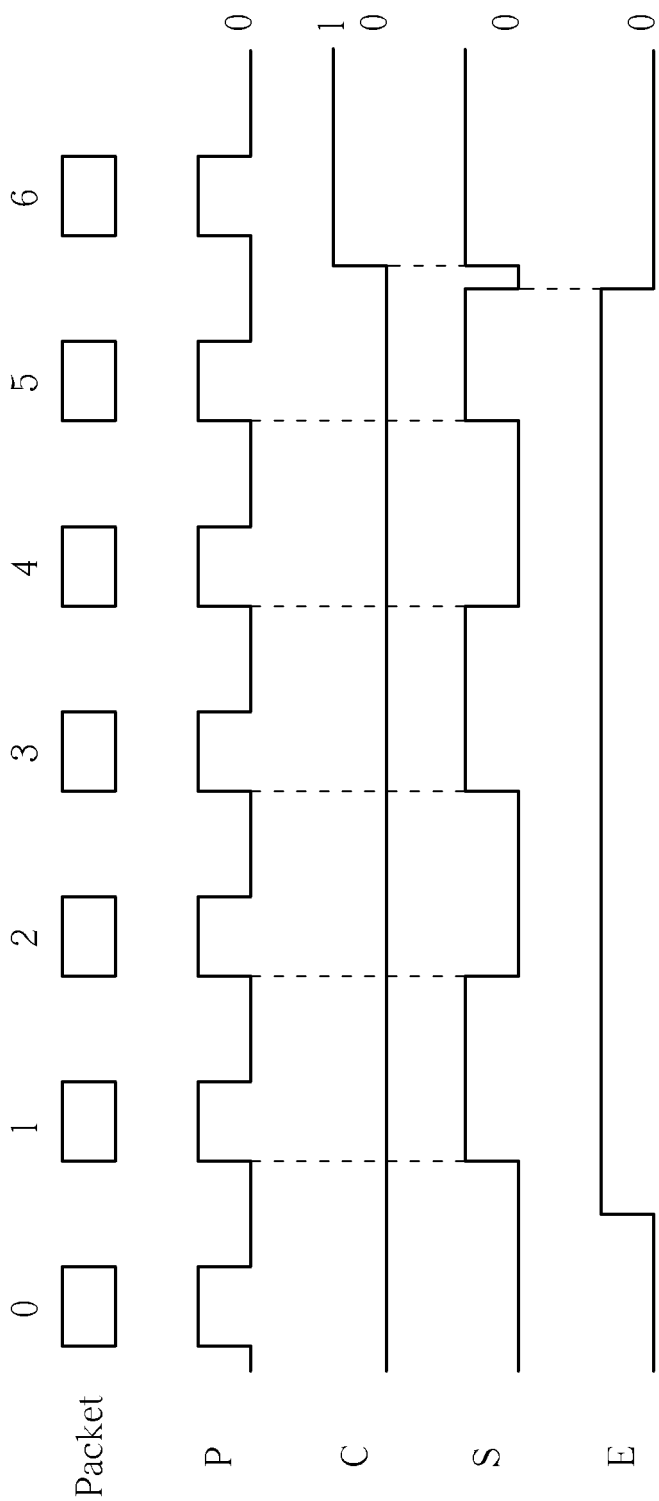
FIG. 6 shows an another simplified timing diagram of a plurality of packets 0-6, the packet detecting signal P, the antenna switch control signal S, the control signal E, and the antenna setting signal C of the antenna diversity apparatus.

In addition, please refer to FIG. 6. FIG. 6 shows an another simplified timing diagram of a plurality of packets 0-6, the packet detecting signal P, the antenna switch control signal S, the control signal E, and the antenna setting signal C of the antenna diversity apparatus 300. The difference between the simplified timing diagram shown in FIG. 6 and the simplified timing diagram shown in FIG. 5 will be explained as follows. As shown in FIG. 6, after the antenna switch selecting unit 350 enters the antenna training mode, the antenna switch selecting unit 350 will control the switching unit 330 to generate the antenna switch control signal S according to each packet starting time point provided by the packet detecting signal P to control the switching unit 330 to constantly switch among the first group of antenna 310 and the second group of antenna 320, so as to change the selection of the group of receiving antenna. Since there is no other difference between the simplified timing diagram shown in FIG. 6 and the simplified timing diagram shown in FIG. 5, further explanation of the details and operations of FIG. 6 are omitted herein for the sake of brevity.

Figure 7:
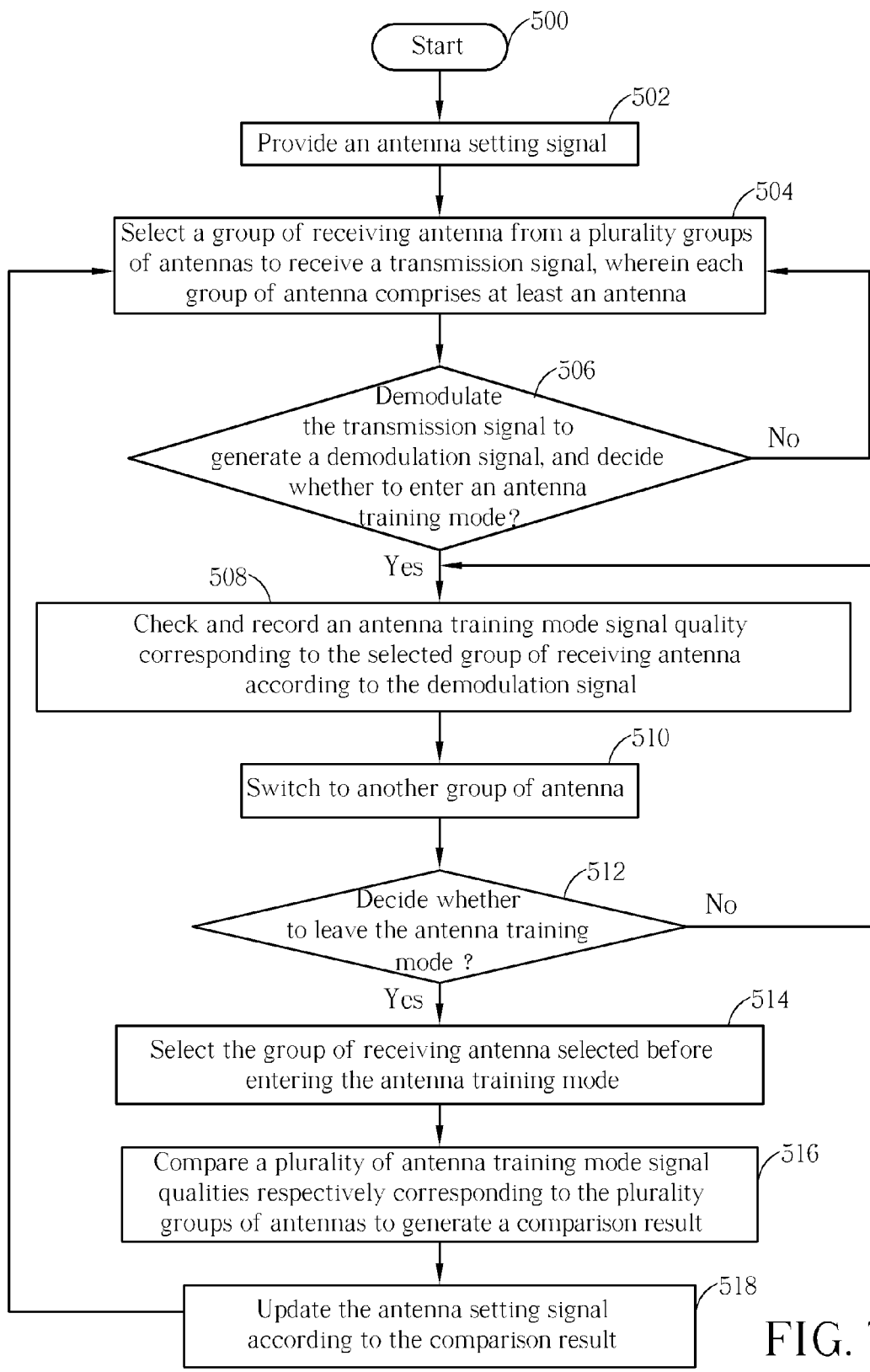
FIG. 7 is a flowchart showing an antenna diversity method of an embodiment in the present invention in accordance with the above operation schemes of the antenna diversity apparatus and FIG. 5 and FIG. 6.

Next, please refer to FIG. 7. FIG. 7 is a flowchart showing an antenna diversity method of an embodiment in the present invention in accordance with the above operation schemes of the antenna diversity apparatus 300 and FIG. 5 and FIG. 6. Provided that substantially the same result is achieved, the steps of the process flowchart need not be in the exact order shown and need not be contiguous, that is, other steps can be intermediate. The antenna diversity method of this embodiment comprises the following steps:

Step 500: Start.

Step 502: Provide an antenna setting signal.

Step 504: Select a group of receiving antenna from a plurality groups of antennas to receive a transmission signal, wherein each group of antenna comprises at least an antenna.

Step 506: Demodulate the transmission signal to generate a demodulation signal, and decide whether to enter an antenna training mode; if yes, then perform Step 508; if no, then go back to Step 504.

Step 508: Check and record an antenna training mode signal quality corresponding to the selected group of receiving antenna according to the demodulation signal.

Step 510: Switch to another group of antenna.

Step 512: Decide whether to leave the antenna training mode; if yes, then perform Step 514; if no, then go back to Step 508.

Step 514: Select the group of receiving antenna selected before entering the antenna training mode.

Step 516: Compare a plurality of antenna training mode signal qualities respectively corresponding to the plurality groups of antennas to generate a comparison result.

Step 518: Update the antenna setting signal according to the comparison result.

Figure 8:
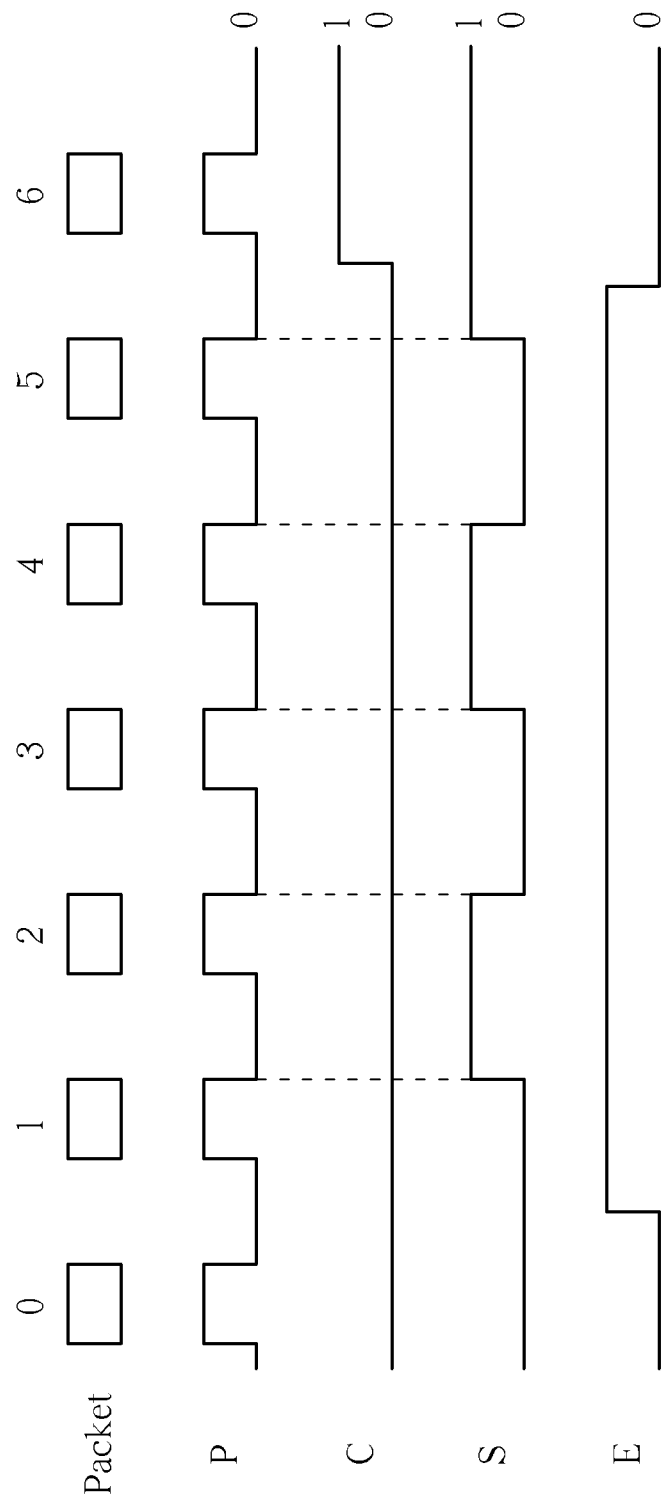
FIG. 8 shows an another simplified timing diagram of a plurality of packets 0-6, the packet detecting signal P, the antenna switch control signal S, the control signal E, and the antenna setting signal C of the antenna diversity apparatus.

Please note that Step 514 is an optional step in the antenna diversity method of FIG. 7, that is, Step 514 can be omitted. Please refer to FIG. 8. FIG. 8 shows an another simplified timing diagram of a plurality of packets 0-6, the packet detecting signal P, the antenna switch control signal S, the control signal E, and the antenna setting signal C of the antenna diversity apparatus 300. The difference between the simplified timing diagram shown in FIG. 8 and the simplified timing diagram shown in FIG. 5 will be explained as follows. As shown in FIG. 5, when the antenna switch selecting unit 350 leaves the antenna training mode, the signal value of the antenna switch control signal S is affected. In other words, before the comparison result is generated, the signal value of the antenna switch control signal S will return to the setting value which is set before entering the antenna training mode. However, as shown in FIG. 8, when the antenna switch selecting unit 350 leaves the antenna training mode, the signal value of the antenna switch control signal S is not affected. In other words, before the comparison result is generated, the signal value of the antenna switch control signal S will maintain in the setting value which is set when leaving the antenna training mode. Since there is no other difference between the simplified timing diagram shown in FIG. 8 and the simplified timing diagram shown in FIG. 5, further explanation of the details and operations of FIG. 8 are omitted herein for the sake of brevity.

Figure 9:
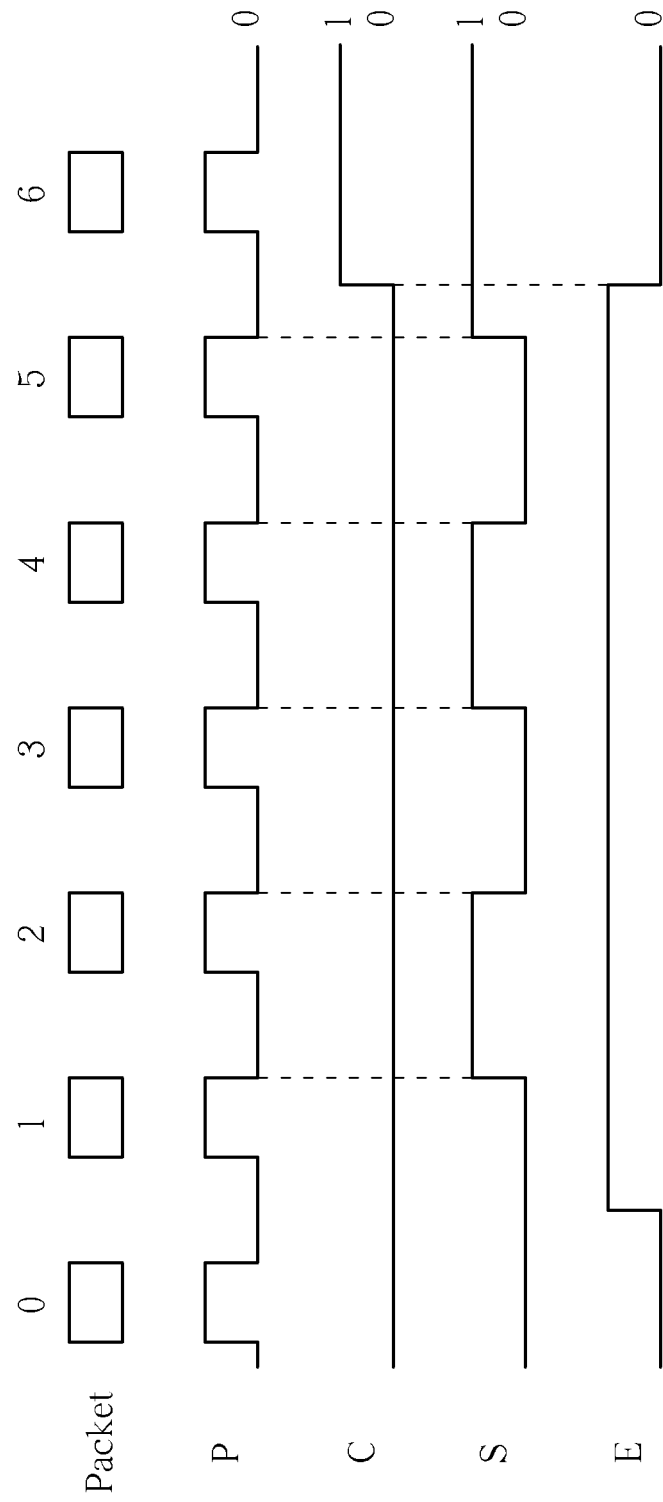
FIG. 9 shows an another simplified timing diagram of a plurality of packets 0-6, the packet detecting signal P, the antenna switch control signal S, the control signal E, and the antenna setting signal C of the antenna diversity apparatus.

In addition, in another embodiment, Step 516 also can be done before deciding to leave the antenna training mode. For example, before leaving the antenna training mode, the antenna diversity method of the present invention can generate the comparison result after passing through a specific training time, and also can generate the comparison result after obtaining a specific number of antenna training mode signal qualities. In other words, the antenna diversity method of the present invention will decide to leave the antenna training mode after generating the comparison result in this embodiment. Please refer to FIG. 9. FIG. 9 shows an another simplified timing diagram of a plurality of packets 0-6, the packet detecting signal P, the antenna switch control signal S, the control signal E, and the antenna setting signal C of the antenna diversity apparatus 300. The difference between the simplified timing diagram shown in FIG. 9 and the simplified timing diagram shown in FIG. 8 will be explained as follows. As shown in FIG. 9, before the antenna switch selecting unit 350 leaves the antenna training mode, the control unit 360 compares two antenna training mode signal qualities respectively corresponding to the first group of antenna 310 and the second group of antenna 320 to generate a comparison result, and thus the antenna setting signal C can change simultaneously when the antenna switch selecting unit 350 leaves the antenna training mode, and the antenna switch control signal S controls the switching unit 330 according to the antenna setting signal C, so as to select a proper antenna. Since there is no other difference between the simplified timing diagram shown in FIG. 9 and the simplified timing diagram shown in FIG. 8, further explanation of the details and operations of FIG. 9 are omitted herein for the sake of brevity.

Figure 10:
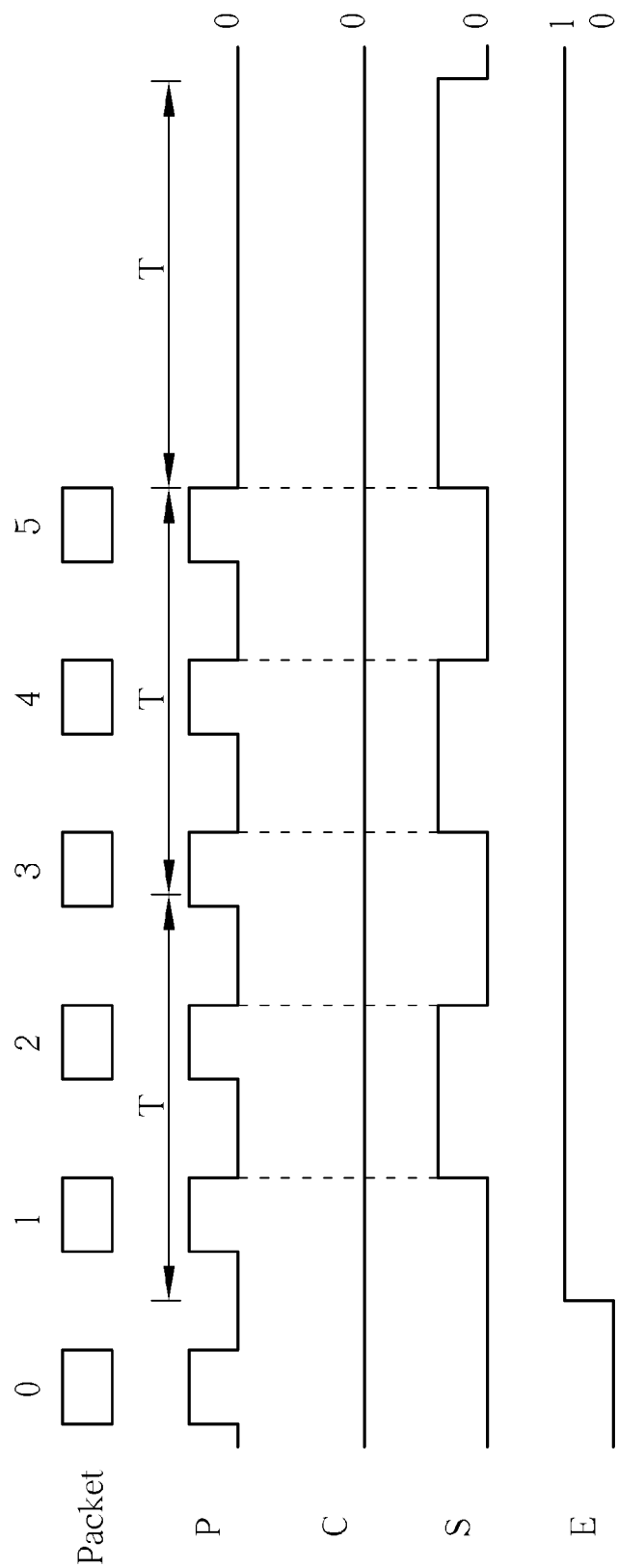
FIG. 10 shows another simplified timing diagram of a plurality of packets 0-6, the packet detecting signal P, the antenna switch control signal S, the control signal E, and the antenna setting signal C of the antenna diversity apparatus.

Please note that the above embodiment is only for an illustrative purpose and is not meant to be a limitation of the present invention. For example, please refer to FIG. 10. FIG. 10 shows another simplified timing diagram of a plurality of packets 0-6, the packet detecting signal P, the antenna switch control signal S, the control signal E, and the antenna setting signal C of the antenna diversity apparatus 300. As shown in FIG. 10, for example, an initial signal value of the antenna setting signal C provided by the antenna decision unit 366 is 0, that is, the first group of antenna 310 is selected as the group of receiving antenna in the beginning. An initial signal value of the control signal E generated by the antenna decision unit 366 is 0, that is, the antenna switch selecting unit 350 has not entered the antenna training mode yet in the beginning. When receiving no packet, the signal value of the packet detecting signal P is 0, and the signal value of the packet detecting signal P is 1 during receiving any packet. Meanwhile, the demodulating unit 340 will determine whether any packet is received during a specific duration T (i.e. determine whether any transmission signal is received during the specific duration T). After the signal value of the control signal E generated by the antenna decision unit 366 converts from 0 to 1 (i.e. after the antenna switch selecting unit 350 has entered the antenna training mode), if the demodulating unit 340 determines that at least a packet is received during the specific duration T (as shown in FIG. 10), then the operations of the antenna diversity apparatus 300 is same as the content of the description about FIG. 5 mentioned above, and thus further explanation of the details and operations are omitted herein for the sake of brevity. However, if the demodulating unit 340 determines that no packet is received during the specific duration T (as shown in FIG. 10), then the signal value of the antenna switch control signal S generated by the antenna switch selecting unit 350 will change (for example, converting from 1 to 0, as shown in FIG. 10), that is, the antenna switch control signal S generated by the antenna switch selecting unit 350 will control the switching unit 330 to switch the receiving antenna (for example, switching from the second group of antenna 320 to the first group of antenna 310, as shown in FIG. 10).

Figure 11:
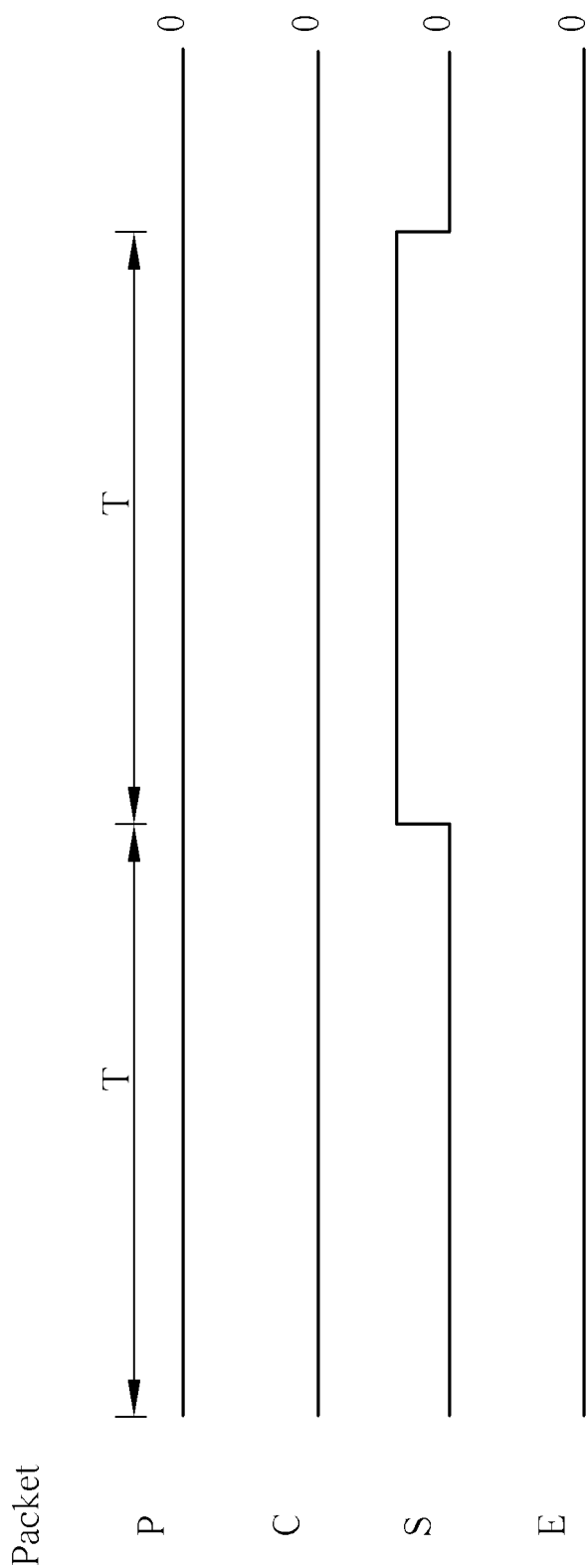
FIG. 11 shows another simplified timing diagram of a plurality of packets 0-6, the packet detecting signal P, the antenna switch control signal S, the control signal E, and the antenna setting signal C of the antenna diversity apparatus.

In addition, please refer to FIG. 11. FIG. 11 shows another simplified timing diagram of a plurality of packets 0-6, the packet detecting signal P, the antenna switch control signal S, the control signal E, and the antenna setting signal C of the antenna diversity apparatus 300. As shown in FIG. 11, for example, when the signal value of the control signal E generated by the antenna decision unit 366 maintains in 0 (i.e., when the antenna switch selecting unit 350 has not entered the antenna training mode yet), if the demodulating unit 340 determines that no packet is received during the specific duration T (as shown in FIG. 11), then the signal value of the antenna switch control signal S generated by the antenna switch selecting unit 350 will change (for example, converting from 0 to 1 and converting from 1 to 0, as shown in FIG. 11), that is, the antenna switch control signal S generated by the antenna switch selecting unit 350 will control the switching unit 330 to switch the receiving antenna (for example, switching from the first group of antenna 310 to the second group of antenna 320 and switching from the second group of antenna 320 to the first group of antenna 310, as shown in FIG. 11).

Figure 12:
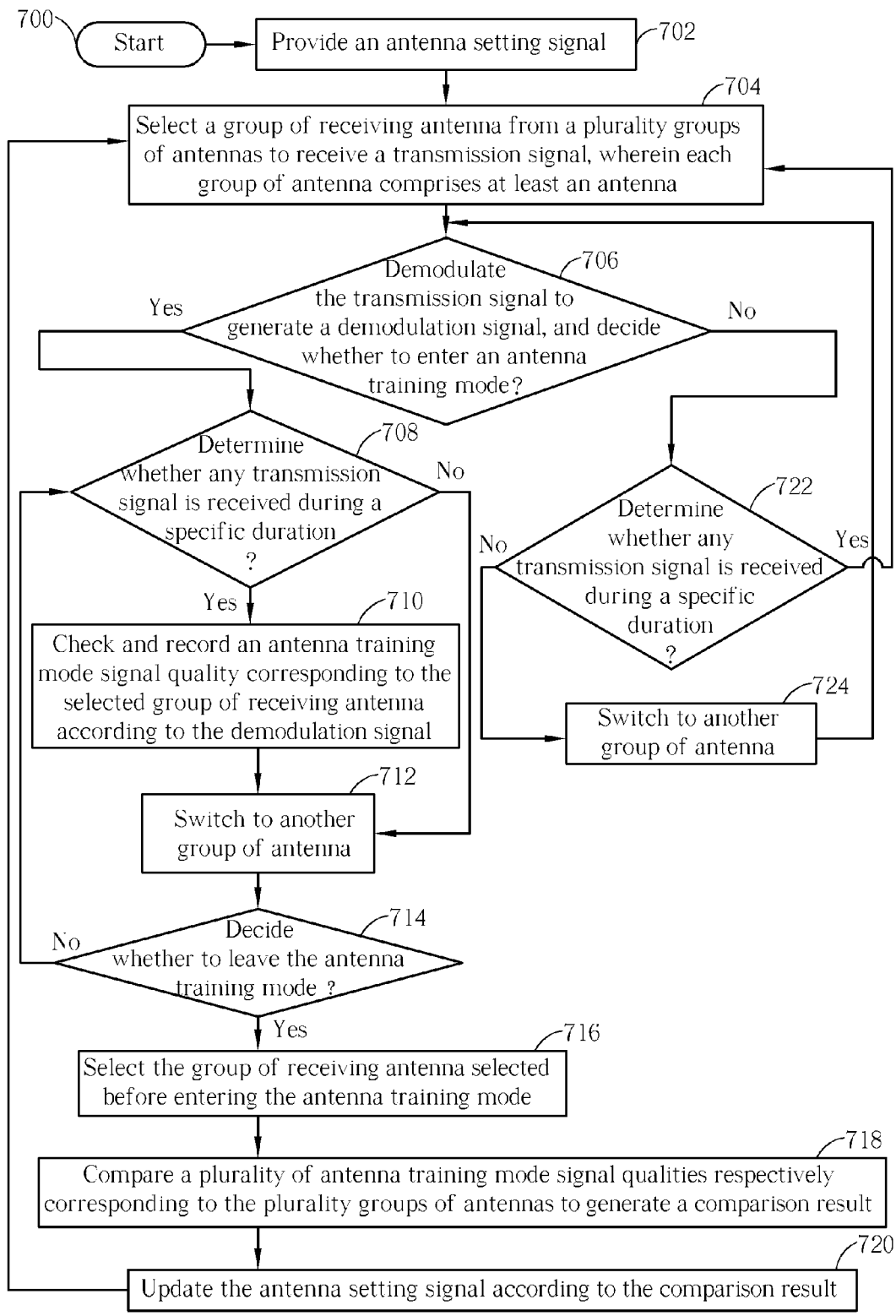
FIG. 12 is a flowchart showing an antenna diversity method of another embodiment in the present invention in accordance with the above operation schemes of the antenna diversity apparatus and FIG. 10 and FIG. 11.

Next, please refer to FIG. 12. FIG. 12 is a flowchart showing an antenna diversity method of another embodiment in the present invention in accordance with the above operation schemes of the antenna diversity apparatus 300 and FIG. 10 and FIG. 11. Provided that substantially the same result is achieved, the steps of the process flowchart need not be in the exact order shown and need not be contiguous, that is, other steps can be intermediate. The antenna diversity method of this embodiment comprises the following steps:

Step 700: Start.
Step 702: Provide an antenna setting signal.
Step 704: Select a group of receiving antenna from a plurality groups of antennas to receive a transmission signal, wherein each group of antenna comprises at least an antenna.
Step 706: Demodulate the transmission signal to generate a demodulation signal, and decide whether to enter an antenna training mode; if yes, then perform Step 708; if no, then perform Step 722.
Step 708: Determine whether any transmission signal is received during a specific duration; if yes, then perform Step 710; if no, then perform Step 712.
Step 710: Check and record an antenna training mode signal quality corresponding to the selected group of receiving antenna according to the demodulation signal.
Step 712: Switch to another group of antenna.
Step 714: Decide whether to leave the antenna training mode; if yes, then perform Step 716; if no, then go back to Step 708.
Step 716: Select the group of receiving antenna selected before entering the antenna training mode.
Step 718: Compare a plurality of antenna training mode signal qualities respectively corresponding to the plurality groups of antennas to generate a comparison result.
Step 720: Update the antenna setting signal according to the comparison result.
Step 722: Determine whether any transmission signal is received during a specific duration; if yes, then perform Step 704; if no, then perform Step 724.
Step 724: Switch to another group of antenna.

Please note that Step 716 is an optional step in the antenna diversity method of FIG. 12, that is, Step 716 can be omitted. In addition, in another embodiment, Step 718 also can be done before deciding to leave the antenna training mode. For example, before leaving the antenna training mode, the antenna diversity method of the present invention can generate the comparison result after passing through a specific training time, and also can generate the comparison result after obtaining a specific number of antenna training mode signal qualities. In other words, the antenna diversity method of the present invention will decide to leave the antenna training mode after generating the comparison result in this embodiment.

Briefly summarized, the antenna diversity apparatus and the antenna diversity method provided by the present invention can switch antennas fast to avoid the defect of occurring burst error to reduce transmitting data rate, and switch to proper antennas fast when variation of the data transmission channels occurs.

Those skilled in the art will readily observe that numerous modifications and alterations of the device and method may be made while retaining the teachings of the invention.

What is claimed is:
1. An antenna diversity apparatus, comprising:
a plurality groups of antennas, each group of antenna comprising at least an antenna;
a switching unit, coupled to the plurality groups of antennas, for making a selection of a group of receiving antenna from the plurality groups of antennas to receive a transmission signal;

a demodulating unit, coupled to the switching unit, the demodulating unit comprising a packet detector, for detecting the transmission signal to generate a packet detecting signal, wherein the demodulating unit is utilized for demodulating the transmission signal to generate a demodulation signal;

an antenna switch selecting unit, coupled to the switching unit and the packet detector of the demodulating unit, for receiving the packet detecting signal from the packet detector, and generating an antenna switch control signal according to the packet detecting signal to control the switching unit to switch among the plurality groups of antennas, so as to change the selection of the group of receiving antenna; and a control unit, coupled to the demodulating unit and the antenna switch selecting unit, for receiving the demodulation signal from the demodulating unit and providing an antenna setting signal to control the selection of the group of receiving antenna, and generate a control signal to decide the antenna switch selecting unit whether to enter or leave an antenna training mode, wherein after the control unit controls the antenna switch selecting unit to enter the antenna training mode, the control unit records an antenna training mode signal quality corresponding to the group of receiving antenna selected by the switching unit according to the demodulation signal, and the control unit compares a plurality of antenna training mode signal qualities respectively corresponding to the plurality groups of antennas to generate a comparison result, and updates the antenna setting signal according to the comparison result to decide the selection of the group of receiving antenna.

2. The antenna diversity apparatus of claim 1, wherein when the antenna switch selecting unit enters the antenna training mode, the antenna switch selecting unit generates the antenna switch control signal according to any packet starting time point or any packet ending time point provided by the packet detecting signal to control the switching unit to switch among the plurality groups of antennas, so as to change the selection of the group of receiving antenna.

3. The antenna diversity apparatus of claim 1, wherein when the antenna switch selecting unit enters the antenna training mode, the antenna switch selecting unit generates the antenna switch control signal according to each packet starting time point or each packet ending time point provided by the packet detecting signal to control the switching unit to switch among the plurality groups of antennas, so as to change the selection of the group of receiving antenna.

4. The antenna diversity apparatus of claim 1, wherein after the antenna switch selecting unit enters the antenna training mode, the antenna switch selecting unit generates the antenna switch control signal according to the packet detecting signal.

5. The antenna diversity apparatus of claim 1, wherein after the antenna switch selecting unit leaves the antenna training mode, the antenna switch selecting unit generates the antenna switch control signal according to the updated antenna setting signal.

6. The antenna diversity apparatus of claim 1, wherein each antenna training mode signal quality comprises a receiving signal quality and a packet detecting result, and the control unit comprises:

a receiving signal quality detecting unit, coupled to the demodulating unit, for detecting a plurality of receiving signal qualities of the plurality groups of antennas;

a packet detecting unit, coupled to the demodulating unit, for generating a plurality of packet detecting results of the plurality groups of antennas; and an antenna decision unit, coupled to the receiving signal quality detecting unit, the packet detecting unit, and the antenna switch selecting unit, and the antenna decision unit being utilized for providing the antenna setting signal to control the selection of the group of receiving antenna, and generate the control signal to decide the antenna switch selecting unit whether to enter or leave the antenna training mode, wherein after the antenna decision unit controls the antenna switch selecting unit to enter the antenna training mode, the antenna decision unit records an antenna training mode signal quality corresponding to the group of receiving antenna selected by the switching unit according to the demodulation signal, and the antenna decision unit compares a plurality of antenna training mode signal qualities respectively corresponding to the plurality groups of antennas to generate the comparison result, and updates the antenna setting signal according to the comparison result to control the selection of the group of receiving antenna via the antenna switch selecting unit and the switching unit.

7. The antenna diversity apparatus of claim 6, wherein the antenna decision unit decides whether to control the antenna switch selecting unit to enter the antenna training mode according to the receiving signal quality of the group of receiving antenna.

8. The antenna diversity apparatus of claim 6, wherein the antenna decision unit decides whether to control the antenna switch selecting unit to enter the antenna training mode according to a specific time period.

9. The antenna diversity apparatus of claim 1, wherein the demodulating unit further determines whether any transmission signal is received during a specific duration to generate a determining signal to the antenna switch selecting unit; and when the antenna switch selecting unit has entered the antenna training mode and the determining signal indicates that the demodulating unit does not receive any transmission signal during the specific duration, the antenna switch selecting unit controls the switching unit to change the selection of the group of receiving antenna.

10. The antenna diversity apparatus of claim 1, wherein the demodulating unit further determines whether any transmission signal is received during a specific duration to generate a determining signal to the antenna switch selecting unit; and when the antenna switch selecting unit does not enter the antenna training mode and the determining signal indicates the demodulating unit does not receive any transmission signal during the specific duration, the antenna switch selecting unit controls the switching unit to change the selection of the group of receiving antenna.

11. An antenna diversity method, comprising:

providing an antenna setting signal;

making a selection of a group of receiving antenna from a plurality groups of antennas to receive a transmission signal, wherein each group of antenna comprises at least an antenna;

detecting the transmission signal to generate a packet detecting signal;

demodulating the transmission signal to generate a demodulation signal;

generating an antenna switch control signal according to the packet detecting signal to switch among the plurality groups of antennas so as to change the selection of the group of receiving antenna;

deciding whether to enter or leave an antenna training mode;

after entering the antenna training mode, switching among the plurality groups of antennas to change the selection of the group of receiving antenna, and recording an antenna training mode signal quality corresponding to the selected group of receiving antenna according to the demodulation signal, so as to obtain a plurality of antenna training mode signal qualities respectively corresponding to the plurality groups of antennas;

comparing the plurality of antenna training mode signal qualities respectively corresponding to the plurality groups of antennas to generate a comparison result; and updating the antenna setting signal according to the comparison result to control the selection of the group of receiving antenna.

12. The antenna diversity method of claim 11, wherein the step of generating the antenna switch control signal according to the packet detecting signal to switch among the plurality groups of antennas so as to change the selection of the group of receiving antenna further comprises:

in the antenna training mode, generating the antenna switch control signal according to any packet starting time point or any packet ending time point provided by the packet detecting signal to switch among the plurality groups of antennas, so as to change the selection of the group of receiving antenna.

13. The antenna diversity method of claim 11, wherein the step of generating the antenna switch control signal according to the packet detecting signal to switch among the plurality groups of antennas so as to change the selection of the group of receiving antenna further comprises:

in the antenna training mode, generating the antenna switch control signal according to each packet starting time point or each packet ending time point provided by the packet detecting signal to switch among the plurality groups of antennas, so as to change the selection of the group of receiving antenna.

14. The antenna diversity method of 11, wherein after deciding to enter the antenna training mode, the antenna diversity method further comprises:

generating the antenna switch control signal according to the packet detecting signal.

15. The antenna diversity method of 11, wherein after deciding to leave the antenna training mode, the antenna diversity method further comprises:

generating the antenna switch control signal according to the updated antenna setting signal.

16. The antenna diversity method of 11, wherein each antenna training mode signal quality comprises a receiving signal quality and a packet detecting result, and the antenna diversity method further comprises:

detecting a plurality of receiving signal qualities of the plurality groups of antennas;

generating a plurality of packet detecting results of the plurality groups of antennas; and generating a control signal to decide whether to enter or leave the antenna training mode.

17. The antenna diversity method of claim 16, wherein step of generating the control signal to decide whether to enter the antenna training mode comprises: deciding whether to enter the antenna training mode according to the receiving signal quality of the group of receiving antenna.

18. The antenna diversity method of claim 16, wherein step of generating the control signal to decide whether to enter the antenna training mode comprises:

deciding whether to enter the antenna training mode according to a specific time period.

19. The antenna diversity method of claim 16, wherein after generating the control signal to decide whether to enter or leave the antenna training mode, the antenna diversity method further comprises:

further determining whether any transmission signal is received during a specific duration to generate a determining signal; and when the antenna training mode has been entered and the determining signal indicates that no transmission signal is received during the specific duration, changing the selection of the group of receiving antenna.

20. The antenna diversity method of claim 16, wherein after generating the control signal to decide whether to enter or leave the antenna training mode, the antenna diversity method further comprises:

further determining whether any transmission signal is received during a specific duration to generate a determining signal; and when the antenna training mode is not entered and the determining signal indicates that no transmission signal is received during the specific duration, changing the selection of the group of receiving antenna.

\* \* \* \* \*